(12) United States Patent
Colglazier et al.

(10) Patent No.: US 6,715,035 B1
(45) Date of Patent: Mar. 30, 2004

(54) CACHE FOR PROCESSING DATA IN A MEMORY CONTROLLER AND A METHOD OF USE THEREOF TO REDUCE FIRST TRANSFER LATENCY

(75) Inventors: Daniel J. Colglazier, Cary, NC (US); Chris Dombrowski, Apex, NC (US); Thomas B. Genduso, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,506

(22) Filed: Feb. 17, 2000

(51) Int. Cl.$^7$ ............................. G06F 12/00; G06F 13/00
(52) U.S. Cl. ........................ 711/118; 711/128; 711/130; 711/145
(58) Field of Search ............................... 711/118, 128, 711/141, 145, 136, 130

(56) References Cited

U.S. PATENT DOCUMENTS 6,098,150 A * 8/2000 Brethour et al. ............ 711/128

* cited by examiner

Primary Examiner—Glenn Gossage
(74) Attorney, Agent, or Firm—Sawyer Law Group; Martin McKinley

(57) ABSTRACT

A cache for use in a memory controller, which processes data in a computer system having at least one processor, and a method for processing data utilizing a cache, are disclosed. The cache comprises a first array such as a tag array, a second array such as a data array, and a pointer for pointing to a portion of the second array that is associated with a portion of the first array, wherein the portion of the second array comprises the data to be processed, and wherein the number of times the at least one processor must undergo a first transfer latency is reduced. This is done by incorporating a prefetch mechanism within the cache. The computer system may include a plurality of processors with each data entry in the data array having an owner bit for each processor. The memory controller may also include a line preloader for prefetching data into the cache. Also, this design can be used in both single processor and multiprocessor systems.

9 Claims, 7 Drawing Sheets

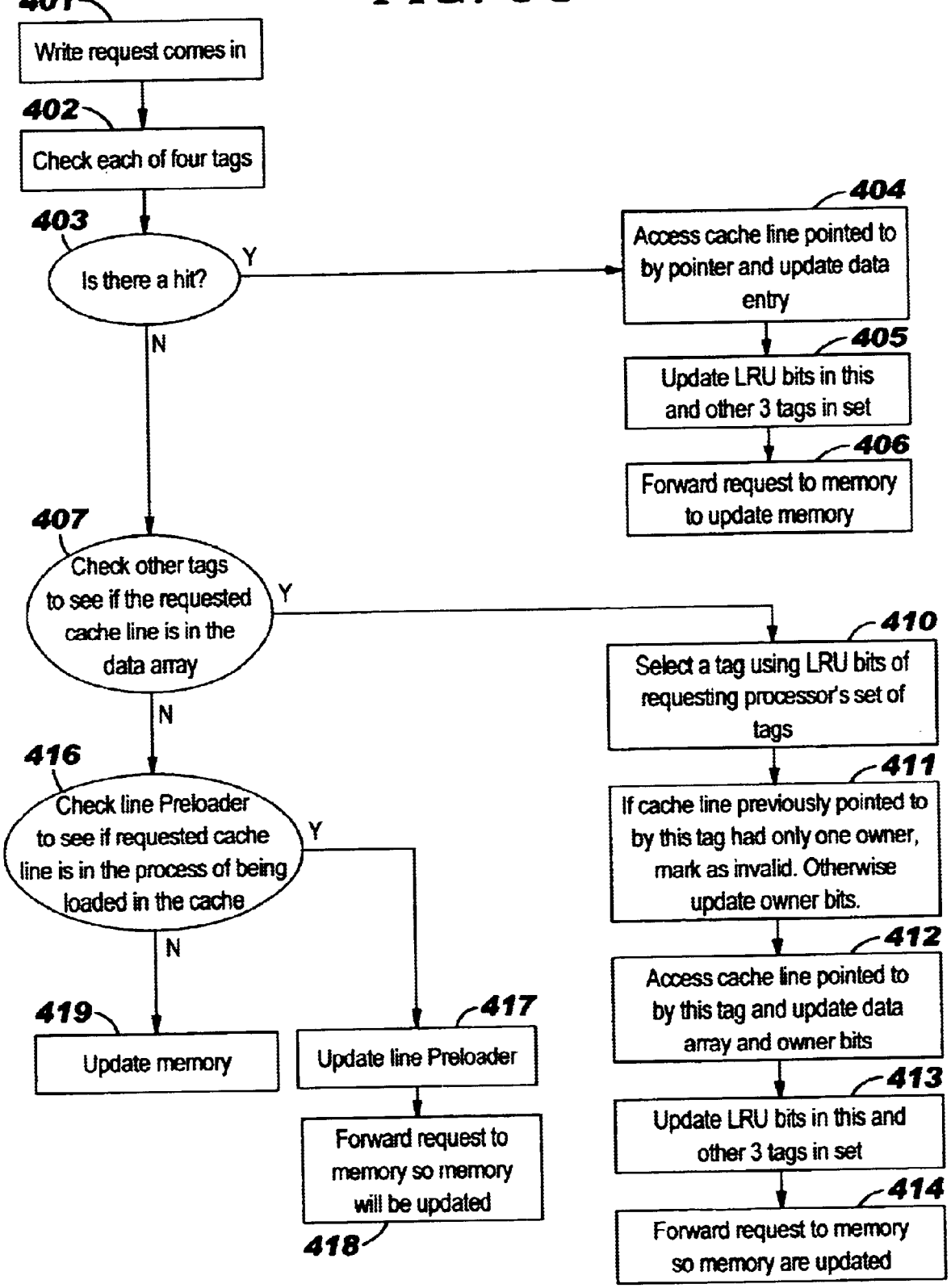

CACHE FOR PROCESSING DATA IN A MEMORY CONTROLLER AND A METHOD OF USE THEREOF TO REDUCE FIRST TRANSFER LATENCY

FIELD OF THE INVENTION

The present invention relates generally to processing systems and more particularly to a system and method for reducing the effective latency of memory transfer.

BACKGROUND OF THE INVENTION

Memory technology is constantly focused on increasing the speed of the transfer of data from the computer memory to the processor. A specific problem that memory technology is faced with concerns first transfer latency. First transfer latency is the time it takes the first piece of data to be returned to a processor once the data is requested from main memory. Because of first transfer latency, a processor must sometimes wait an inordinate amount of time to retrieve data from the memory of the computer system.

Currently the solution to this problem is the use of internal and external processor caches. The cache fetches the data that the processor is requesting plus other data which the processor may request and stores the data in its storage elements. Should a processor request data that is currently in the cache (a cache hit), first transfer latency of the processor is less than if the processor accesses data from main memory. If the data that is requested is not in the cache (a cache miss), the processor has to access the data from memory and incur a first transfer latency delay.

Currently, large external caches on the order of 16 megabytes are implemented to increase the number of cache hits. However, even with the larger caches currently being used, because of the speed difference between the processor and the main memory, the processor can spend 50% of its time simply waiting for data from the main memory. Also, to have the necessary speed to handle the data, these caches must be assembled in a way that may become cost prohibitive. Moreover, the larger the cache the more power it consumes.

Accordingly, what is needed is a system and method for reducing the first transfer latency of a computer processor in order to enable the processor to run more effectively. The present invention addresses such a need.

SUMMARY OF THE INVENTION

A cache for use in a memory controller, which processes data in a computer system having at least one processor, is disclosed. The cache comprises a tag array comprising a plurality of tag entries, wherein each of the plurality of tag entries comprises a tag, at least one least recently used bit, and a pointer. The cache also comprises a data array comprising a plurality of data entries, wherein the pointer points to one of the plurality of data entries, wherein the number of times the at least one processor must undergo a first transfer latency is reduced.

Through the use of a memory controller device in accordance with the present invention, the number of times that a processor must undergo full first transfer latency is reduced. This is done by incorporating a prefetch mechanism within a small cache. By reducing the number of times that a processor must undergo full first transfer latency, computer processors will be able to operate more efficiently. Also, a system and method in accordance with the present invention can be used in both single processor and multi-processor systems.

BRIEF DESCRIPTION OF THE DRAWINGS

FIG. 5c is a flowchart of how the cache in accordance with the present invention handles a write request.

DETAILED DESCRIPTION

The present invention relates to a memory controller for processing data in a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a preferred embodiment. The preferred embodiment of the present invention is a small cache that resides within the memory controller. In the preferred embodiment, the size of the cache is on the order of 16 Kilobytes. The cache is divided into 16 elements of 1 Kilobyte each. Each element contains 1 Kilobyte of contiguous data aligned on a 1 Kilobyte address boundary. Through the use of a memory controller device in accordance with the present invention, the number of times that a processor must undergo first transfer latency is reduced. This is accomplished by incorporating a prefetch mechanism within the small cache, i.e. since data requests from the processor are currently on the order of 32 bytes, the cache effectively prefetches data from memory by its loading of its cache elements with 1 kilobyte of data. Due to data locality, there is a high probability that the processor will request the data that has been prefetched into the cache elements. This reduces the number of times that the processor must directly access memory and thereby reduces the number of times that the processor must wait due to the first access latency of memory. By reducing the number of times that a processor must undergo full first transfer latency, computer processors will be able to operate more efficiently. Also, this design can be used in both single processor and multiprocessor systems.

One aspect of the cache in accordance with the present invention deals with the ownership of data within the cache. When data is placed into the cache, a processor (or "owner") is associated with the data. When a second processor subsequently accesses the same data, the data is considered to have shared owners. Accordingly, the method in accordance with the present invention allows data within the cache to be efficiently shared among the processors without one processor "hogging" the data within the cache.

Figure 1:
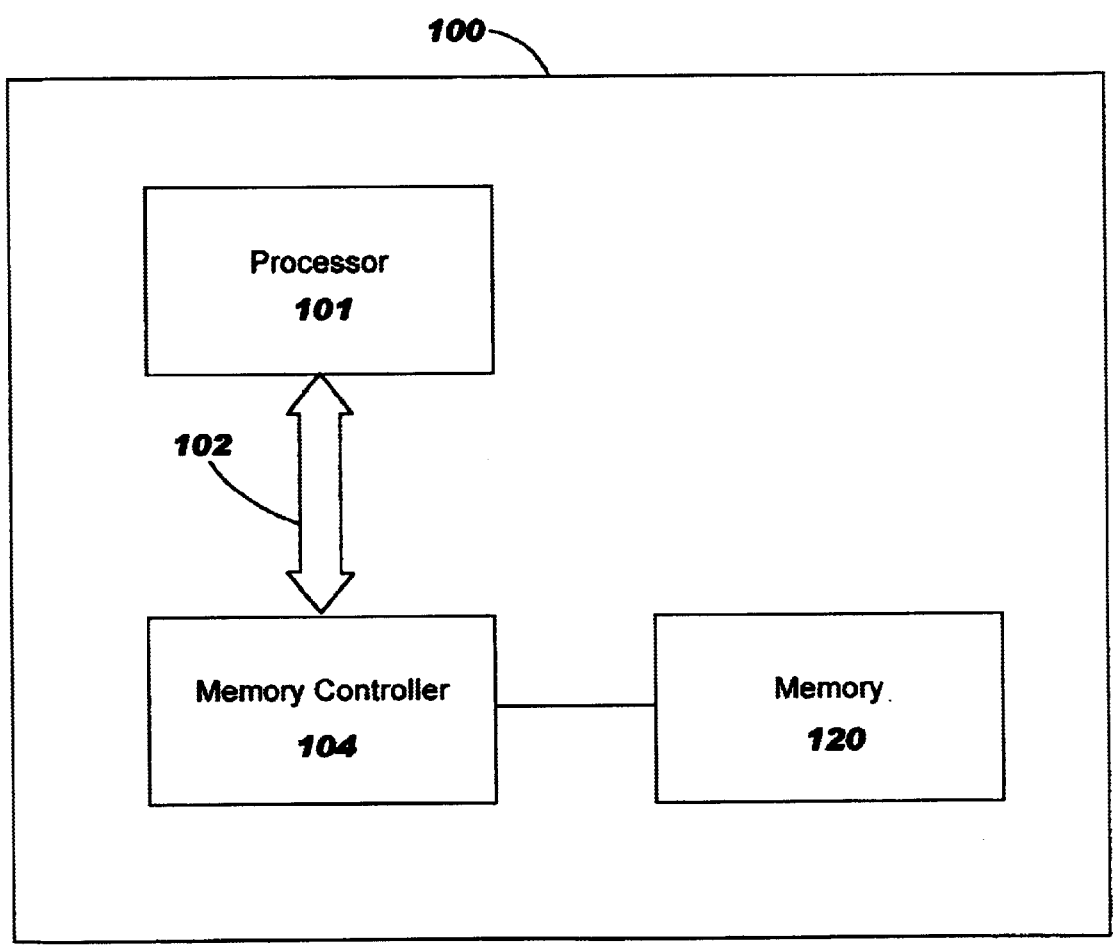
FIG. 1 illustrates a computer system having a processor, a memory controller, and a memory in accordance with the present invention.

FIG. 1 is an example of an overall environment in accordance with the present invention. This environment includes a computer system 100 comprising at least one processor 101, a system bus 102, a memory controller 104 in accordance with the present invention, and a memory 120. In this environment, the system bus 102 is the connection between the memory controller 104 and the at least one processor 101 wherein the memory controller 104 controls the data being read from or written to memory 120 by the at least one processor 101.

Figure 2:
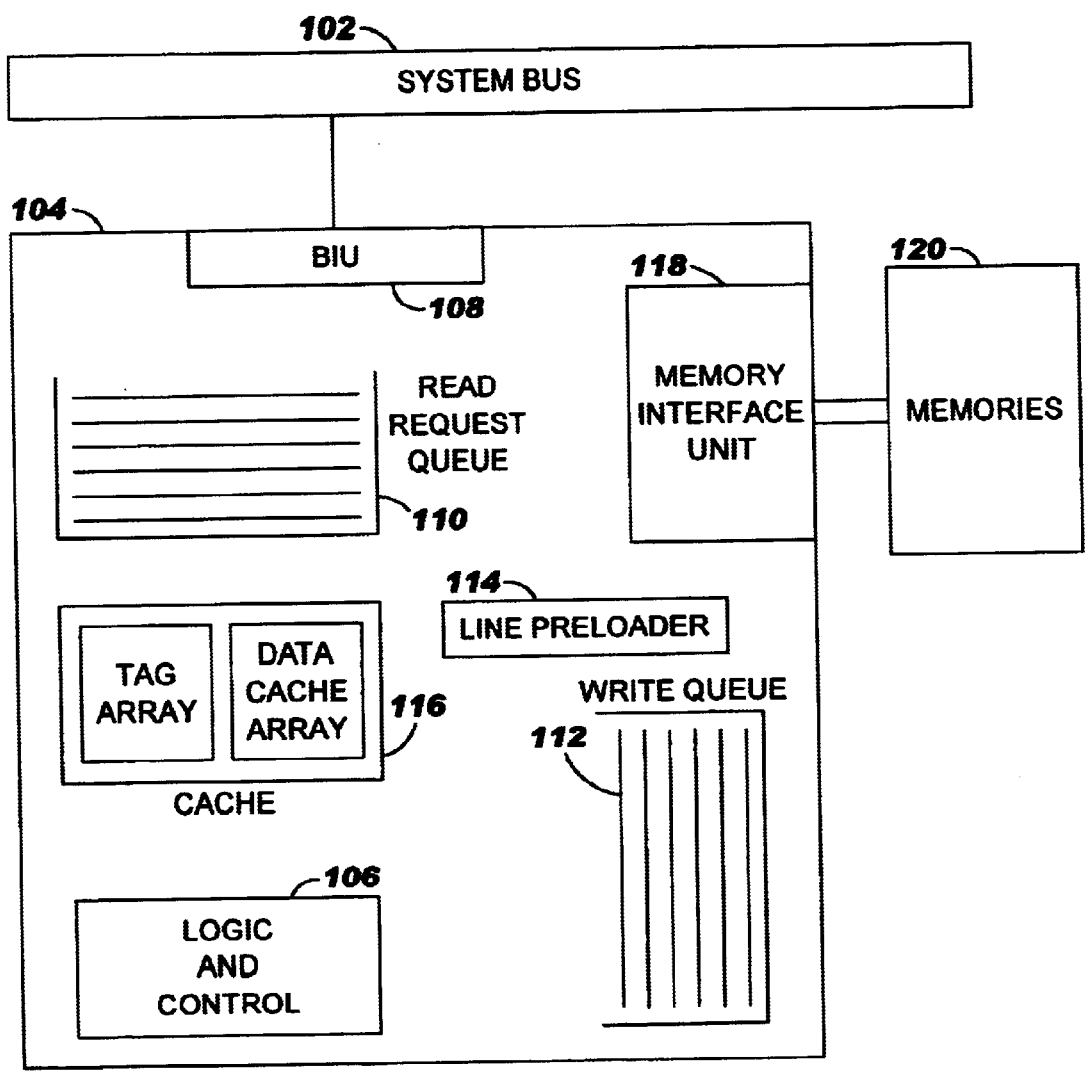
FIG. 2 illustrates the components of the memory controller of FIG. 1 including a cache in accordance with the present invention.

For a better understanding of the memory controller 104 in accordance with the present invention, please refer now to FIG. 2. FIG. 2 illustrates the components of the memory controller 104 of FIG. 1 in accordance with the present invention. These components are a bus interface unit BIU 108, a read request queue 110, a write request queue 112, a memory interface unit 118, a line preloader 114, a cache 116, and a logic and control unit 106.

The bus interface unit (BIU) 108 is the interface between the memory controller 104 and the system bus 102. The BIU 108 contains the necessary logic and buffers required to support the communication protocol of the system bus 102.

The read request queue 110 is responsible for queuing up data read requests. As requests for data from memory (data reads) are sent across the system bus 102 from the at least one processor 101 (FIG. 1), the requests are queued up for service in the read request queue 110. This queue 110 maintains the order in which the read requests are received. With each element in the read request queue 110, there exists a service indicator. The indicator shows whether this read request has already been fully serviced or is waiting for service. The use of the indicator is further explained in the description of the line preloader 114.

The write request queue 112 is responsible for queuing up data write requests. As requests for data to be returned to the memory (data writes) are received from the at least one processor 101 (FIG. 1) via the BIU 108, the requests are queued up for service in the write request queue 112. Coherency is maintained between the read request queue 110, the write request queue 112, the line preloader 114, and the cache 116 by the logic and control unit 106 which is described below.

The memory interface unit 118 is the interface between the memory controller 104 and the physical memory arrays 120. The memory interface unit 118 contains the necessary logic and buffers required to support the communication protocol of the memories. This interface protocol may be synchronous dynamic random access memory (SDRAM) or RAMBUS™ (RBUS) or any other similar protocol.

The line preloader 114 is a temporary storage area for data that is to be loaded into the cache 116 from the memory 120. The amount of data that the line preloader 114 can contain is equal to one cache line of the cache 116. The process of getting a sufficient amount of data from memory 120 to completely fill a cache line requires multiple clock cycles and as the data is read out of the memory 120, it is placed into the line preloader 114. Therefore it is possible that at a specific instant in time, the line preloader 114 may contain a partial cache line of data.

When a read request is not in the cache 116, the memory 120 will be accessed. When the data has been forwarded to the processor the line preloader 114 will fetch the 1 Kilobyte of contiguous data, aligned on a 1 Kilobyte address, which contains the data that had been forwarded to the processor. While the line preloader 114 is accessing the memory, should a second read request (which is also a cache miss) be placed in the read request queue, the line preloader 114 will stop its current fetching from memory. The memory 120 will be accessed and the data for this second request will be forwarded to the processor. This second request will have its service indicator set to indicate that this request has been serviced and the request will be left in the read request queue. The line preloader 114 will then continue fetching the 1 kilobyte of data that it had started. Once the prefetching of this line is complete and the line placed into the cache 116, this request will be removed from the read request queue and the line preloader 114 will begin fetching the 1 K of contiguous data, aligned on a 1 Kilobyte address, which contains the data requested by the second request. The fact that this request's service indicator has been set indicates that the requested data has already been forwarded to the requesting processor. Once the fetching of this line by the line preloader 114 is complete, the line will also be placed into the cache and this second request will be removed from the read request queue.

Although the preferred embodiment of the cache in accordance with the present invention is described wherein cache lines on the order of 1 kilobyte are utilized, one of ordinary skill in the art will readily recognize that a variety of different sized cache lines could be implemented while remaining within the spirit and scope of the present invention.

The logic and control unit 106 contains the algorithms which handle the scheduling of reads and writes to the memory 120. Basically, the logic and control unit 106 maintains coherency between the read request queue 110, write request queue 112, the cache 116, and the line preloader 114.

The cache 116 is a small array of storage elements which can provide data faster than the memory 120. The cache 116 is store through, which means that in the event a data write to the memory 120 occurs and the data is in the cache 116 (a cache hit), the write will be written to the memory 120 and the line within the cache will also be updated.

Figure 3:
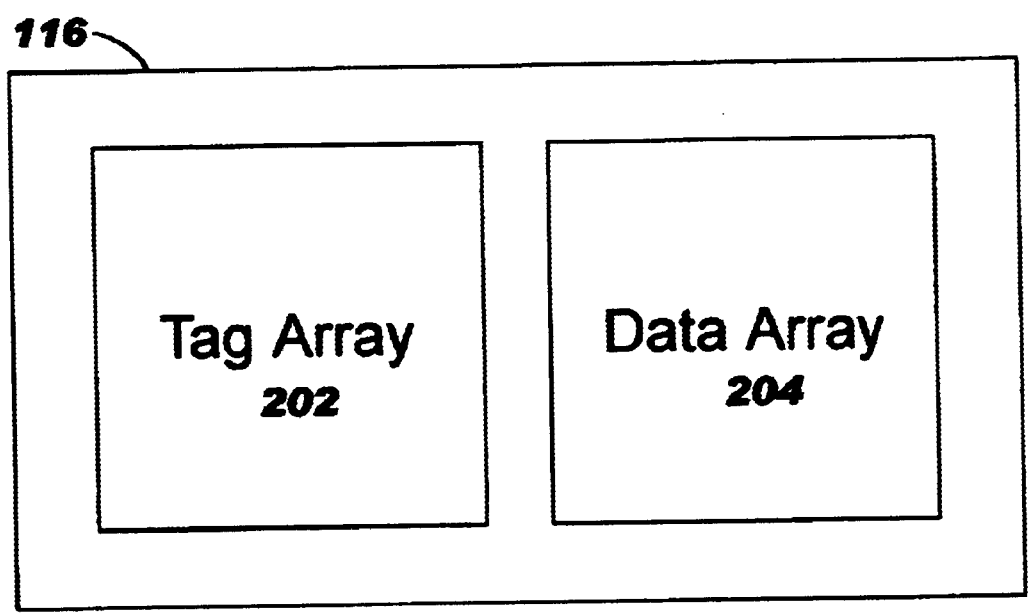
FIG. 3 shows the logical structure of the cache of FIG. 2 in accordance with the present invention.

The purpose of the cache 116 in accordance with the present invention is to reduce the number of times that a processor must see the first access latency which is typically associated with accessing the memory 120. For a better understanding of a cache 116 in accordance with the present invention, please refer now to FIG. 3. FIG. 3 shows the logical structure of the cache 116 of FIG. 2 in accordance with the present invention.

The cache 116 comprises a tag array 202 and a data array 204. In accordance with the preferred embodiment of the present invention, the relationship between the tag elements and the data elements is not fixed. Rather, a pointer allows a tag in the tag array 202 to be associated with any data element in the data array 204. For an explanation of this relationship in more detail, refer now to the following description.

Figure 4:
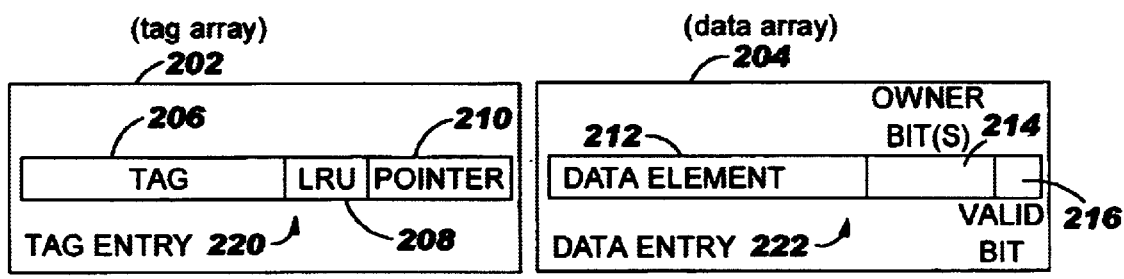
FIG. 4 is a detailed illustration of the tag array and the data array in the cache of FIG. 3 in accordance with the present invention.

FIG. 4 is a detailed illustration of the tag array 202 and the data array 204 in the cache 116 of FIG. 3. The tag array 202 comprises a plurality of tag entries 220, wherein each of the plurality of tag entries 220 comprises a tag 206, one or more least recently used (LRU) bit(s) 208, and a pointer 210. The data array 204 comprises a plurality of data entries 222, wherein each of the plurality of data entries 222 comprises a data element 212 of 1 kilobyte of data, a corresponding owner bit(s) 214 (1 owner bit per processor), and a corresponding valid/invalid bit 216. Additionally, the number of tag entries in the tag array 202 does not necessarily have to equal the number of entries in the data array 204.

Each tag 206 within the tag array 202 is used to identify a data element 212 in the data array 204 based on the physical address of the data element within the data array 204. The tag entries 220 are dedicated on a per processor basis. For example, if there are 4 processors and there are 16 tag entries, each processor will be "assigned" 4 tag entries. This group of 4 tag entries is subsequently referred to as a class.

When entries within the data array 204 are to be replaced, a least recently used (LRU) selection algorithm is used to determine which data entry of a class within the data array 204 will be replaced. An LRU selection algorithm determines which entry of the data array is to be replaced by selecting the entry, within the class, that has been accessed least recently. However, one of ordinary skill in the art will readily recognize that a variety of selection methods could be used while remaining within the spirit and scope of the present invention.

The pointer 210 links the tag array 202 and the data array 204. A tag can reference any data element in the data array 204. The pointer 210 points to the specific data entry in the data array 204 that is associated with the tag. Furthermore, multiple tags can point to the same data element in the data array 204. Accordingly, each of the plurality of data elements 212 can be accessed (referenced) by any processor in the computer system. The owner bit(s) 214 indicate(s) which processor currently owns (is currently accessing) a data entry. Consequently, each of the plurality of data entries 212 contains one owner bit 214 for each processor in the computer system.

A valid/invalid bit 216 is used to indicate whether or not the data element contains valid data. At initial startup, all the valid bits are set to invalid indicating the cache is effectively empty. However, as the data array 204 compiles and transfers data, the valid/invalid bit 216 of each data entry in the data array 204 is updated.

Cache Operation

Figure 5A:
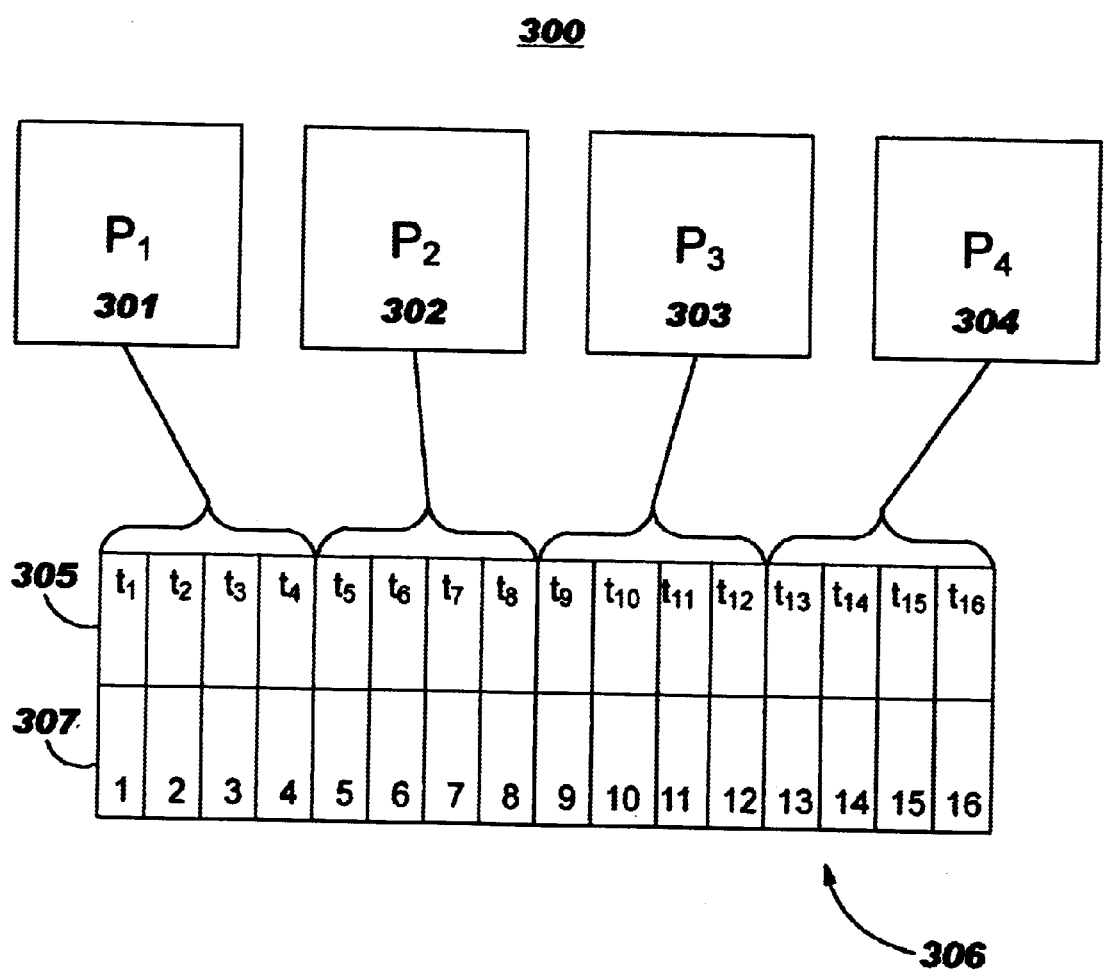
FIG. 5a illustrates a system in accordance with the present invention.
Figure 5B:
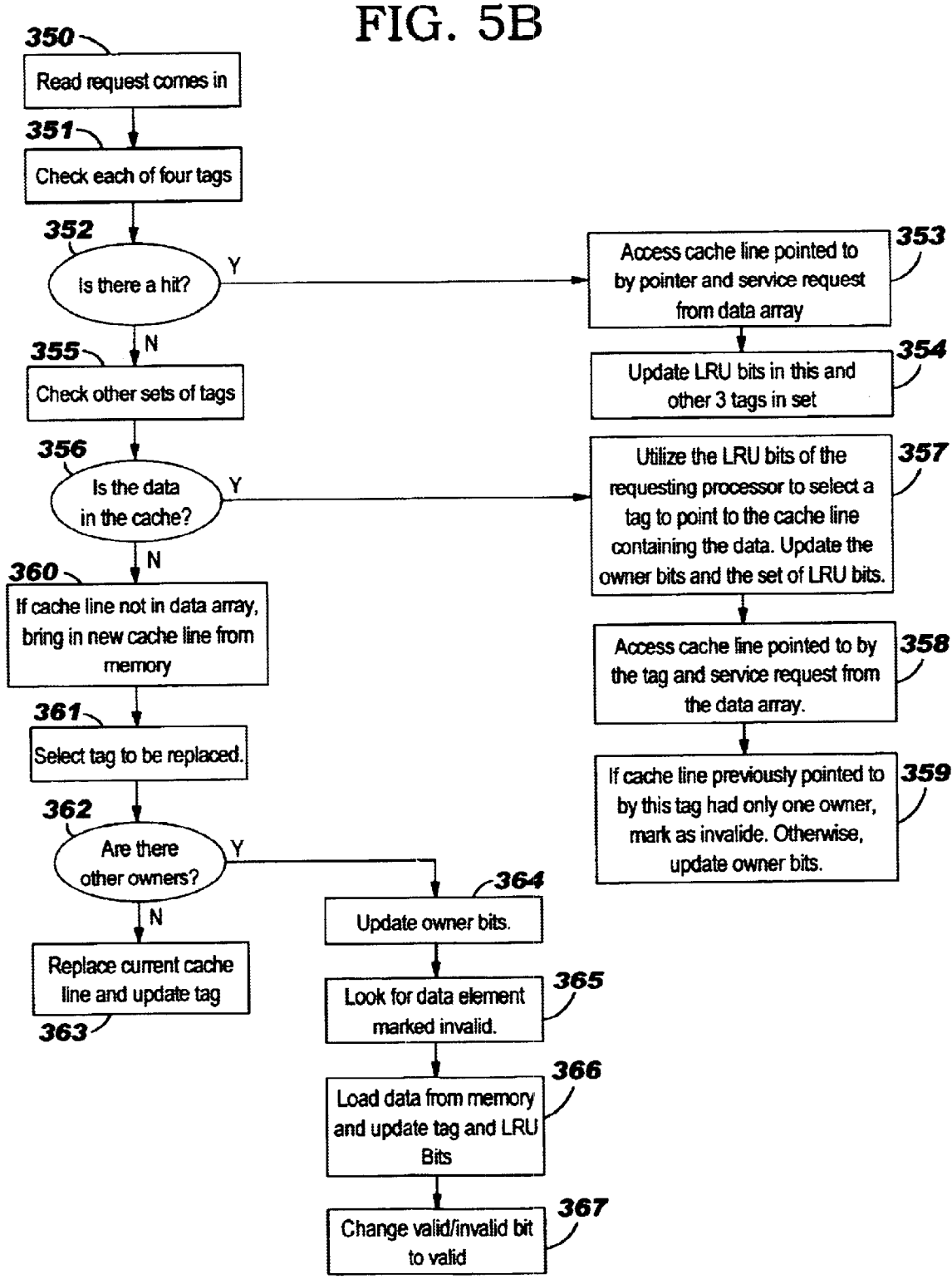
FIG. 5b is a flowchart of how the cache in accordance with the present invention handles a read request.

For a better understanding of the operation of the cache 116 in accordance with the present invention, please refer now to FIGS. 5a–c. The following description is relative to an embodiment of the invention wherein there are sixteen total lines of data in the cache and there are four processors in the system. FIG. 5a displays such a system 300. The system 300 includes four processors 301–304, and a cache 306 comprising a plurality of tag entries referred to simply as tags 305 wherein each of the plurality of tags 305 corresponds to a single line of a data array 307. At start up, since there are four processors and 16 cache lines in the data array 307, each of the four processors 301–304 are assigned a class, or set, of 4 tags (i.e., processor 301 is assigned tags $t_1-t_4$, processor 302 is assigned tags $t_5-t_8$, etc.). FIG. 5b is a flowchart of how the cache in accordance with the present invention handles a read request. FIG. 5c is a flowchart of how the cache in accordance with the present invention handles a write request.

Read Request

Referring now to FIG. 5b, first, a read request comes in from a requesting processor, in step 350. Each of the four tags associated with this requesting processor is then checked, in step 351. It is then determined whether there is a hit, in step 352. If there is a hit, the cache line, which is pointed to by the pointer, is then accessed and the request is serviced from the data array, in step 353. The LRU bits in this and the other three tags in this class are then updated, in step 354.

If there is a miss, in step 352, then the other tags are checked to see if the requested cache line is in the data array, in step 355. If the requested cache line is in the data array, the requested cache line is owned by another processor. Preferably, the checking of a specific processor class (in step 355) along with the checking of the other classes (also in step 355) is done in parallel. However, to simplify the implementation, the classes can be checked in a more 'sequential' manner at a slight cost in overall performance.

If the requested cache line is in the data array, then the LRU bits of the requesting processor's set of tags will be utilized to select one of the tags to be set to point to this cache line also, and the LRU bits of the requesting processor's set of tags will be updated in step 357. Also, the owner bits of this cache line will be updated to indicate that the requesting processor is also an owner. The cache line, which is pointed to by the pointer, is then accessed and the request is serviced from the data array, in step 358. If the cache line that had been pointed to by this tag has no other owners, then this cache line will be marked as invalid, otherwise the owner bits of the cache line will be updated to reflect that this processor is no longer an owner, in step 359.

If the requested cache line is not in the data array, in step 355, then the requested cache line must be brought in from memory, in step 360. Using the LRU bits of the appropriate set of tags, a tag will be selected to be replaced, in step 361. When the tag is determined, the data currently in the cache that is accessed by this tag will be checked to see if there are other "owners" of this cache line, in step 362. If there are no other owners, then the current cache line will be replaced with the data from memory and the tag will be updated, in step 363.

If there are other owners, then the 'owner' bits will be updated to reflect that this processor is no longer an owner, in step 364. The system will then look for a cache line, which is marked invalid, in step 365. This cache line will then be loaded with the data from memory and the tag and the associated LRU bits will be updated, in step 366. The invalid/valid bit of the cache line will then be changed to valid, in step 367.

Write Request

The following discussion relates to how the method in accordance with the present invention handles a write request. Referring now to FIG. 5c, first a write request is received from a requesting processor, in step 401. Next, each of the four tags associated with the requesting processor is checked, in step 402.

It this then determined whether there is a hit, in step 403. If there is a hit, then the cache line, which is pointed to by the pointer, is accessed and the data array is updated, in step 404. The LRU bits in this and the other three tags in this set are then updated, in step 405. The Request is then forwarded to the memory and the memory is accordingly updated, in step 406.

If there is a miss, in step 403, then the other tags will be checked to see if the requested cache line is in the data array, in step 407. If the requested cache line is currently in the data array, then using the LRU bits of the requesting processor's set of tags, a tag will then be selected and will be set to point to this cache line, in step 410. If the cache line that had been pointed to by this tag has no other owners, then this cache line will be marked as invalid, otherwise the owner bits of the cache line will be updated to reflect that this processor is no longer an owner, in step 411. Next, the cache line that is now pointed to by this tag is accessed and the data array is updated, and the owner bits will also be updated to indicate that the requesting processor is also an owner, in step 412. Next, the LRU bits in this and the other three tags in this set are updated, in step 413. The request is then forwarded to the memory and the memory is accordingly updated, in step 414.

If the requested cache line is not in the data array, in step 407, then the line preloader will be checked to see if the requested cache line is in the process of being loaded in the cache, in step 416. If the line is in the line preloader, then the preloader will be updated, in step 417. The request is then forwarded to the memory and the memory is accordingly updated, in step 418. If the requested cache line is not in the line preloader, as determined in step 416, then the memory will simply be updated, in step 419.

Through the use of a memory controller device in accordance with the present invention, the number of times that a processor must undergo full first transfer latency is reduced. This is done by incorporating a prefetch method within a small cache. By reducing the number of times that a processor must undergo full first transfer latency, computer processors will be able to operate more efficiently. Also, this design can be used in both single processor and multiprocessor systems.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A cache for use in a memory controller, which processes data in a computer system having a plurality of processors, the cache comprising:

a tag array comprising a plurality of tag entries, wherein each of the plurality of tag entries comprises a tag and a pointer; and a data array comprising a plurality of data entries, wherein each of the plurality of data entries comprises an owner bit for each of the plurality of processors, wherein the owner bit indicates that a corresponding processor is currently accessing the cache, wherein each pointer points to one of the plurality of data entries, wherein no data entries are stored in the tag array.

2. A memory controller including a line preloader and a cache coupled to the line preloader, the memory controller for processing data in a computer system, the computer system comprising a plurality of processors, the memory controller comprising:

a data array, the data array comprising a plurality of data entries, each data entry comprising an owner bit for each of the plurality of processors, wherein the owner bit indicates that a corresponding processor is currently accessing the cache; and a tag array, the tag array comprising a plurality of tag entries, wherein each of the plurality of tag entries comprises a tag, a least recently used bit and a pointer for pointing to one of the plurality of data entries.

3. A method of processing data in a computer system having a plurality of processors and a cache coupled to the plurality of processors, the method comprising the steps of:

a) generating a request to process a portion of data;

b) pointing to a portion of the cache containing the portion of data;

c) associating a plurality of tag entries with the plurality of processors, each tag entry comprising a pointer;

d) associating a plurality of data entries with the plurality of processors, wherein each of the plurality of data entries comprises an owner bit for each of the plurality of processors, wherein the owner bit indicates that a corresponding processor is currently accessing the cache; and e) determining if the pointer of one of the plurality of tag entries associated with the plurality of processors points to a data entry comprising the portion of data, wherein no data entries are stored in the plurality of tag entries.

4. The method of claim 3 wherein if the pointer of the one of the plurality of tag entries associated with the plurality of processors points to a data entry comprising the portion of data, the method further comprises the step of:

b3) accessing the portion of data and servicing the request to process the portion of data.

5. The method of claim 3 wherein if the pointer of the one of the plurality of tag entries associated with the plurality of processors does not point to a data entry comprising the portion of data, the method further comprises the step of:

b3) determining if the pointer of one of the plurality of tag entries associated with another of the plurality of processors points to a data entry comprising the portion of data.

6. The method of claim 5 wherein if the pointer of the one of the plurality of tag entries associated with another of the plurality of processors points to a data entry comprising the portion of data, the method further comprises the step of:

b4) pointing to the data entry comprising the portion of data, the data entry comprising owner bits;

b5) updating the owner bits of the data entry comprising the portion of data;

b6) accessing the portion of data; and b7) servicing the request to process the portion of data.

7. The method of claim 5 wherein if the pointer of the one of the plurality of tag entries associated with another of the plurality of processors does not point to a data entry comprising the portion of data, the method further comprises the steps of:

b4) bringing the portion of data in from an external memory;

b5) accessing the portion of data; and b6) servicing the request to process the portion of data.

8. A processing system comprising:

a plurality of processors;

a memory controller coupled to the plurality of processors, the memory controller including a cache, the cache comprising:

a tag array comprising a plurality of tag entries, wherein each of the plurality of tag entries comprises a tag and a pointer;

a data array comprising a plurality of data entries, wherein each of the plurality of data entries comprises an owner bit for each of the plurality of processors, wherein the owner bit indicates that a corresponding processor is currently accessing the cache, wherein each pointer points to one of the plurality of data entries, wherein no data entries are stored in the tag array.

9. The processing system of claim 8 wherein the memory includes a line preloader coupled to the cache.

* * * * *